UNITED STATES PATENT OFFICE.

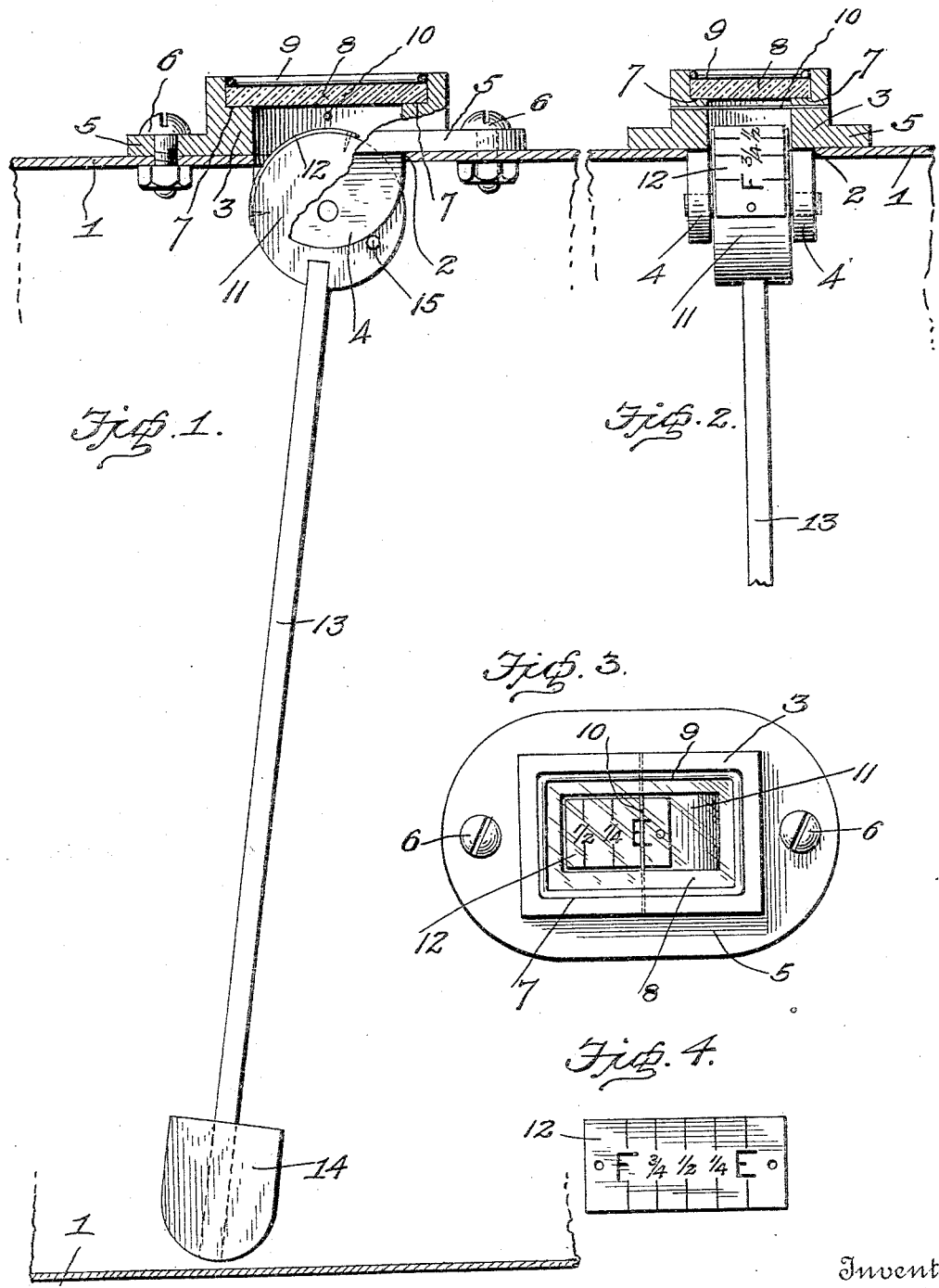

ARTHUR S. GARLICK, OF MERIDEN, CONNECTICUT.

LIQUID-GAGE.

943,868.  Specification of Letters Patent.  Patented Dec. 21, 1909.

Application filed July 19, 1909. Serial No. 508,283.

*To all whom it may concern:*

Be it known that I, ARTHUR S. GARLICK, a citizen of the United States, residing at Meriden, in the county of New Haven and State of Connecticut, have invented certain new and useful Improvements in Liquid-Gages; and I do declare the following to be a full, clear, and exact description of the invention, such as will enable others skilled in the art to which it appertains to make and use the same.

This invention relates to improvements in liquid gages for tanks or containers.

One object of the invention is to provide a gage of this character which may be used in connection with any form of tank, but which is particularly adapted for use in connection with the gasolene or oil tanks of automobiles, motor boats and the like, whereby the quantity of oil in the tank will be accurately indicated.

Another object is to provide a device of this character which will be simple, strong, durable and comparatively inexpensive in construction, efficient in operation and well adapted to the purposes for which it is designed.

With the foregoing and other objects in view, the invention consists of certain novel features of construction, combination and arrangement of parts, as will be more fully described and particularly pointed out in the appended claim.

In the accompanying drawings, Figure 1 is a sectional view of the gage applied to a tank; Fig. 2 is a similar view taken at right angles to Fig. 1; Fig. 3 is a top plan view of the gage; Fig. 4 is a similar view of the dial plate.

Referring more particularly to the drawings, 1 denotes the tank which may be of any desired construction and in the upper side of the tank is formed an opening 2, in which is arranged my improved gage. The gage comprises a hollow frame 3 having on its opposite sides downwardly projecting apertured bearing ears or lugs 4 and is provided with a circumferential flange 5. When applied to the tank, the ears or lugs 4 project through the opening 2 and the flange 5 engages the outer side of the tank and is secured thereto by bolts or other suitable fastening devices 6.

The body portion of the frame 3 is preferably rectangular in shape and is provided around its inner side, adjacent to its upper edge with a recess which forms a seat 7 to receive a transparent cover plate 8 which is preferably formed of glass and is secured in the seat 7 by a retaining wire 9 which is arranged around the edges of the plate, as shown. Arranged transversely through the frame, below the cover plate 8 and in a direct line with the bearing apertures in the lugs 4, is an indicating wire or rod 10, the purpose of which will hereinafter appear.

Pivotally mounted between the bearing lugs 4 of the frame 3, is an indicating cylinder 11, on the upper portion of which is secured a dial plate 12. The plate 12 is provided with a series of indicating marks which are designed to show the quantity of fluid in the container to which the gage is applied. The indicating marks at the extreme opposite ends of the dial plate indicate when the tank is full or empty and these marks are designated, respectively, by the letter F, meaning full, and the letter E, meaning empty. The intermediate marks on the dial indicate when the tank is one-quarter, one-half and three-quarters full and are so designated.

Secured to the lower side of the indicating cylinder 11, at a point diametrically opposite to the empty mark on the dial, is a float supporting rod 13, on the lower end of which is secured a suitable float 14. The rod 13 is of such length that the float on the lower end thereof extends substantially to the bottom of the tank, so that when the tank is empty, the float will lower until the empty mark on the dial plate is brought in line with the indicating wire or rod 10 in the gage frame. As the tank is filled, the float will rise and thus turn the cylinder 11 to bring the consecutive indicating marks thereon below the indicating wire until the full mark is brought in line with the wire, when it will be known that the tank is full. On one end of the indicating cylinder is arranged a laterally projecting stop pin 15, which, when the float is lowered to the position wherein the empty mark is in line with the indicating wire, will engage the adjacent bearing lug 4, thus limiting the further movement of the float and the indicating cylinder in this direction.

A gage constructed as herein shown and described, will be positive and accurate in operation and may be readily applied to any form of tank to indicate the condition of the contents thereof.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

In a tank gage, a supporting frame, a transparent cover plate arranged in said frame, an indicating wire arranged below said plate, an indicating cylinder pivotally mounted in said frame below said wire, a dial plate arranged on said cylinder, said plate having thereon a series of indicating marks adapted to be brought in line with said indicating wire to designate the quantity of liquid in the tank, a float rod secured to said cylinder, a float on the opposite end of said rod, and a stop pin arranged in said cylinder and adapted to engage a fixed part of the frame to limit the movement of the float and the cylinder in one direction.

In testimony whereof I have hereunto set my hand in presence of two subscribing witnesses.

ARTHUR S. GARLICK.

Witnesses:
  BENJ. PAGE,
  ALICE B. PORTIS.